(12) United States Patent
Cedergren

(10) Patent No.: US 9,010,774 B2
(45) Date of Patent: Apr. 21, 2015

(54) RAISER FOR SKIDPAN PRACTICE WITH MOTORCYCLE AND DEVICE COMPRISING SUCH A RAISER

(71) Applicant: Cedergrens Mek. Verkstad Aktiebolag, Klintehamn (SE)

(72) Inventor: Curt Cedergren, Klintehamn (SE)

(73) Assignee: Cedergrens Mek. Verkstad Aktiebolag, Klintehamn (SE)

( * ) Notice: Subject to any disclaimer, the term of this patent is extended or adjusted under 35 U.S.C. 154(b) by 0 days.

(21) Appl. No.: 14/358,979

(22) PCT Filed: Nov. 13, 2012

(86) PCT No.: PCT/SE2012/000185
§ 371 (c)(1),
(2) Date: May 16, 2014

(87) PCT Pub. No.: WO2013/074013
PCT Pub. Date: May 23, 2013

(65) Prior Publication Data
US 2014/0319791 A1      Oct. 30, 2014

(30) Foreign Application Priority Data

Nov. 17, 2011   (SE) ....................................... 1100858

(51) Int. Cl.
*G09B 9/042*   (2006.01)
*B62H 1/12*    (2006.01)
*G09B 9/058*   (2006.01)
*B62H 1/02*    (2006.01)

(52) U.S. Cl.
CPC   *B62H 1/12* (2013.01); *G09B 9/042* (2013.01); *G09B 9/058* (2013.01); *B62H 1/02* (2013.01)

(58) Field of Classification Search
None
See application file for complete search history.

(56) References Cited

U.S. PATENT DOCUMENTS 3,844,421  A  * 10/1974  Nielsen ......................... 414/678
4,700,798  A  * 10/1987  Johansson et al. ............ 180/209
4,998,594  A  *  3/1991  Orloski ......................... 180/198

(Continued)

FOREIGN PATENT DOCUMENTS

EP   1594103 A2   11/2005
FR   2729241 A1   7/1996

(Continued)

*Primary Examiner* — J. Allen Shriver, II
*Assistant Examiner* — Hilary L Johns
(74) *Attorney, Agent, or Firm* — Dilworth & Barrese, LLP.

(57) ABSTRACT

The invention relates to a raiser (2) for skidpan practice with motorcycle, comprising a supporting portion (3) with support wheels (5*a-c*) and a raising portion (6). The raising portion (6) is attachable to the front wheel of the motorcycle in such a way that it allows the front wheel to rotate around a first rotational axis. The raising portion is raisable and lowerable with respect to the supporting portion. The raising portion is rotatable around a second axis of rotation that essentially extends in the direction of motion of the front wheel, allowing the raiser to be used with motorcycles as they lean sideways in curves. In one embodiment, the second axis of rotation of the raiser is arranged below the upper end of the supporting wheels or below the rotational axes of the supporting wheels. This may for example be achieved if the supporting portion (3) is constituted by a supporting frame (3) receiving the front wheel and if the support wheels (5*a-c*) are mounted on support wheel carriers (11*a-c*) that extend upwards above the supporting frame (3). The invention further relates to a device for skidpan practice with a motorcycle, comprising a pair of supports (12*a-b*) that prevents the motorcycle from falling over, and such a raiser (2).

16 Claims, 4 Drawing Sheets

(56) References Cited

U.S. PATENT DOCUMENTS 5,029,894 A * 7/1991 Willman ................ 280/755
6,647,894 B1 * 11/2003 Simoes ................ 104/172.1
7,815,201 B2 * 10/2010 Ceccarelli et al. .......... 280/79.4

FOREIGN PATENT DOCUMENTS

| JP | 2009-014945 A | 1/2009 |
|---|---|---|
| WO | 84/02689 A1 | 7/1984 |

* cited by examiner

RAISER FOR SKIDPAN PRACTICE WITH MOTORCYCLE AND DEVICE COMPRISING SUCH A RAISER

The present invention relates to a raiser for skidpan practice with motorcycle and device comprising such a raiser according to the introductory portions of the independent claims.

BACKGROUND OF THE INVENTION

During skidpan practice with cars, raisers are often used that raises the vehicle somewhat, such that the pressure between the wheels of the vehicle and the ground decreases. The raiser has castors that allows the vehicle to roll in any direction, even in directions other than the one the wheels of the vehicle is pointing, just like the vehicle would behave in case of slippery conditions. Vehicles with four wheels primarily move parallel to the ground and that makes such a raiser work fine.

Motorcycles and other two-wheeled vehicle do however tilt in curves, and this makes such a raiser mounted on a motorcycle to behave in ways that does not emulate its real behaviour when driving through a curve during slippery conditions.

An object of the invention is therefore to provide a raiser for skidpan practice with motorcycle and device comprising such a raiser, that more closely emulates the behaviour of a motorcycle during driving though a curve on slippery surface.

These and other objects are attained by a raiser for skidpan practice with motorcycle and device comprising such a raiser according to the characterising portions of the independent claims.

SUMMARY OF THE INVENTION

The invention relates to a raiser 2 for skidpan practice with motorcycle, comprising a supporting portion 3 with support wheels 5a-c and a raising portion 6. The raising portion 6 is attachable to the front wheel of the motorcycle in such a way that it allows the front wheel to rotate around a first rotational axis. The raising portion is raisable and lowerable with respect to the supporting portion. The raising portion is rotatable around a second axis of rotation that essentially extends in the direction of motion of the front wheel, advantageously allowing the raiser to be used with motorcycles as they lean sideways in curves.

In a particularly advantageous embodiment, the second axis of rotation of the raiser is arranged below the upper end of the supporting wheels or even more advantageously below the rotational axes of the supporting wheels. This may for example be achieved if the supporting portion 3 is constituted by a supporting frame 3 receiving the front wheel and if the support wheels 5a-c are mounted on support wheel carriers 11a-c that extend upwards above the supporting frame 3.

The invention further relates to a device for skidpan practice with a motorcycle, comprising a pair of supports 12a-b that prevents the motorcycle from falling over, and such a raiser 2.

DESCRIPTION OF PREFERRED EMBODIMENTS

Figure 1:
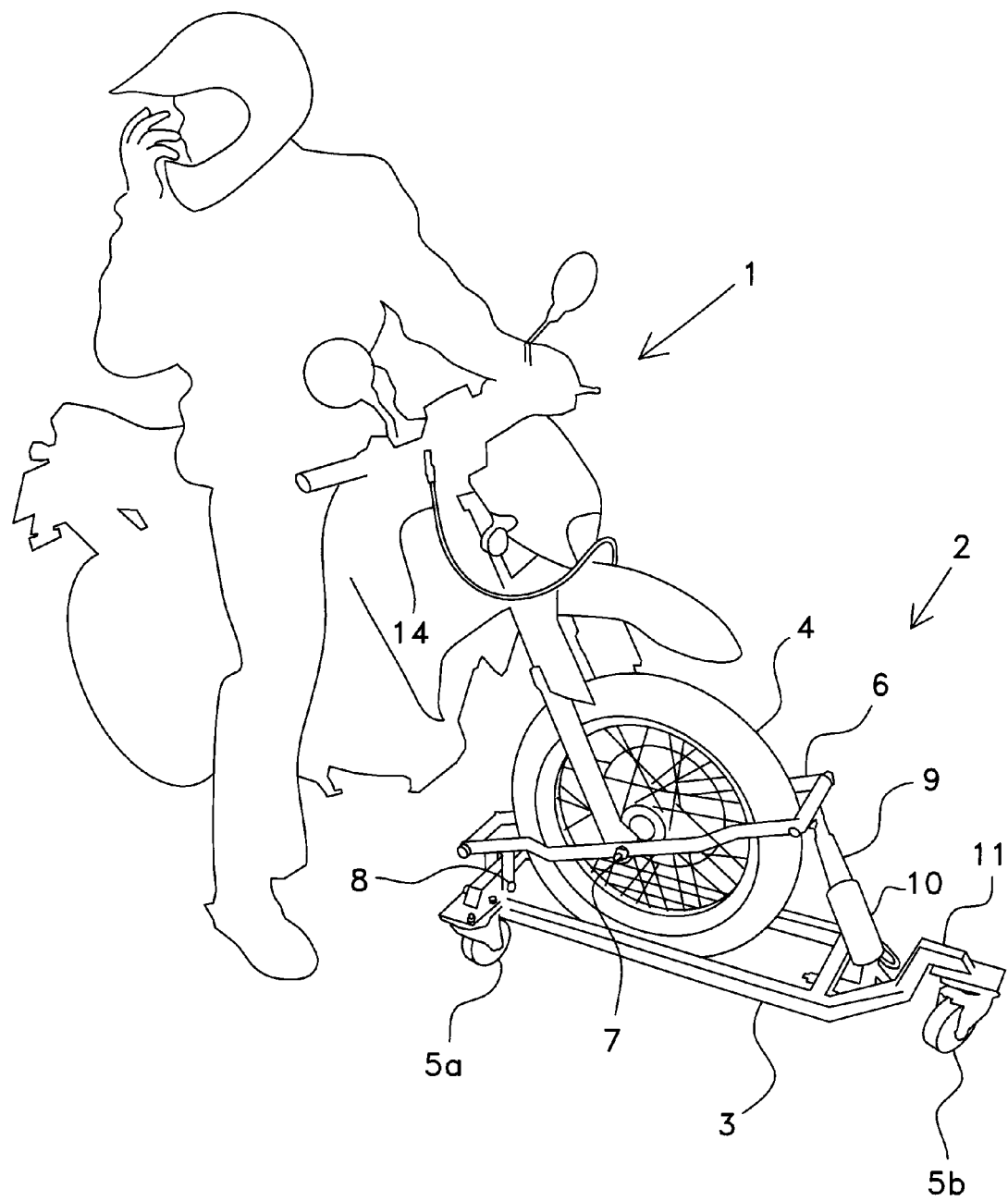
FIG. 1 shows a motorcycle on a first embodiment of the raiser for skidpan practice.

FIG. 1 shows a motorcycle 1 on a first embodiment of the raiser 2 for skidpan practice. The raiser is constituted by a three-wheeled cart built using a support frame 3. The frame 3 is essentially rectangular and has a rectangular opening through which the front wheel 4 of the motorcycle extends to the ground. The frame has two supporting wheels at the rear end 5a, of which only one is visible in the figure, and further a supporting wheel 5b at the front end. The wheels are mounted on a rotatable, vertical axle such that they may be turned in any given direction, and follow the direction of movement of the front wheel of the motorcycle as long as the front wheel does not start to slide sideways on the ground during skidding.

The front wheel 4 of the motorcycle is mounted on a raising frame 6 and is rotatably attached to the raising frame at its centre axis 7. The front wheel 4 is arranged in the interior of the raising frame and is freely rotatable in the raising frame. The raising frame is attached above the support frame using two tiltable support struts, a rear 8 and a front 9 one. Both support struts 8, 9 are tiltably attached to the rear and front cross beams of the support frame, respectively, and may be angled towards either side of the vehicle, such that the front wheel may be angled to the left or right, respectively.

The front support strut 9 is constituted by a cylinder 10 that may be extended or shortened using hydraulic fluid. If the cylinder is extended, the front wheel is raised, but it is not intended to raise above the ground surface, just aligned it against it with a lesser or larger pressure in order to emulate slipperiness. With the cylinder in its shortest state, the front wheel is aligned against the ground surface with the full pressure it would normally apply to the ground. With the cylinder fully extended, the front wheel applies almost no pressure at all to the ground and the whole pressure is applied by the three supporting wheels 5a-b. As these wheels may turn freely in any direction, the motorcycle will behave as if the friction was very low.

In contrast to a four-wheeled vehicle, where all four wheels normally would have a direction of the axis of rotation that is near horizontal, assuming the ground surface is horizontal, a motorcycle may substantially tilt sideways. Using a raiser that raises the front wheel a fixed distance, the front wheel of the motorcycle would have applied different degrees of pressure to the ground depending on whether the wheel is upright or tilted sideways. The raiser according to the invention retains near constant pressure against the ground no matter whether the front wheel is upright of tilted towards either side. This is achieved through the support struts 8, 9 being tiltably attached to the support frame 3 at a position that is very near the ground surface. The supporting frame is arranged closer to the ground surface than the height of the support wheels 5a, b, and this is achieved by the support wheels being attached to support wheel carriers 11, that extends up from the supporting frame.

The supporting frame is raised and lowered by the cylinder 10 depending on how it is being controlled. The cylinder is controlled from a control unit on the handlebar of the motorcycle and the control signals reach the cylinder via a control cable 14.

Figure 2:
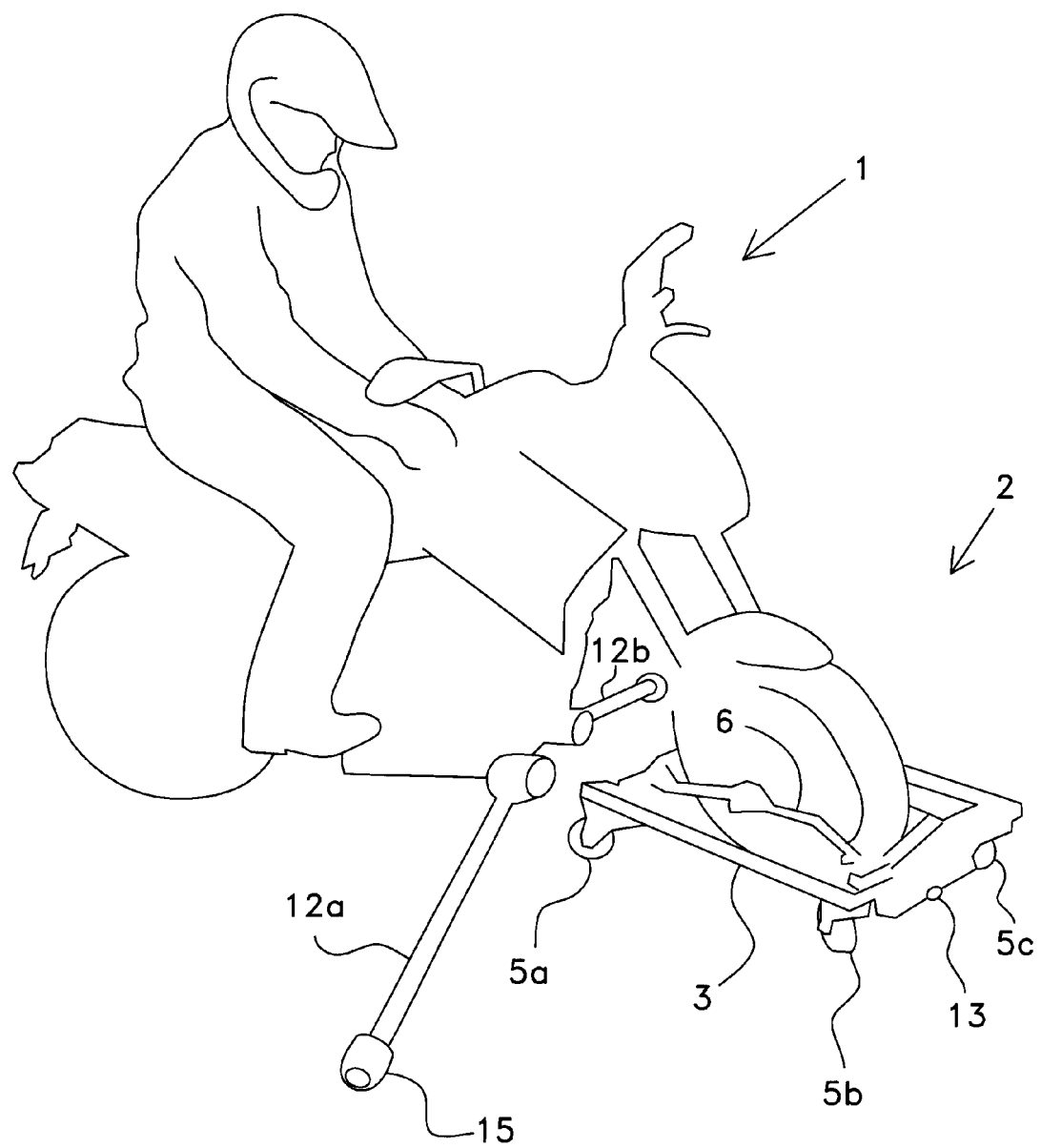
FIG. 2 shows a motorcycle on a second embodiment of the raiser for skidpan practice.

FIG. 2 shows a motorcycle on a second embodiment of the raiser for skidpan practice. The second embodiment is four-wheeled and three of the four support wheels 5*a-c* are visible in the figure. Two of these are attached to the rear corners of the supporting frame and two are attached to the front corners of the supporting frame. The front wheel of the motorcycle I is rotatably attached at its rotational axis to a raising frame 6 that, in a fashion corresponding to that of the first embodiment may be raised using a control device on the handlebar.

The support wheels are attached to the lower side of the supporting frame, while the axis 13 around which the support struts may rotate is arranged under the lower side of supporting frame. This solution places the axis under the axes of the support wheels and is thus situated only two centimetres above the ground surface The design in the first embodiment is different, but the result is the same, that is that the raising frame and therefore the support wheels are rotated around a rotational axis that extends very close to the ground in the forward direction of the front wheel.

The second embodiment further comprises two supports 12*a, b* that prevents the motorcycle from falling over. The supports extend from the centre of the lower portion of the motorcycle and are substantially longer than ordinary supports for preventing the motorcycle from falling over. At the ends of the supports there are in addition rollers 15 that allow the motorcycle to roll forwards with the supports extended. If the raiser is raised to high, the front wheel rises from the ground and may slide sideways, causing it to fall over. The supports are primarily intended for preventing the motorcycle from falling over.

Figure 3:
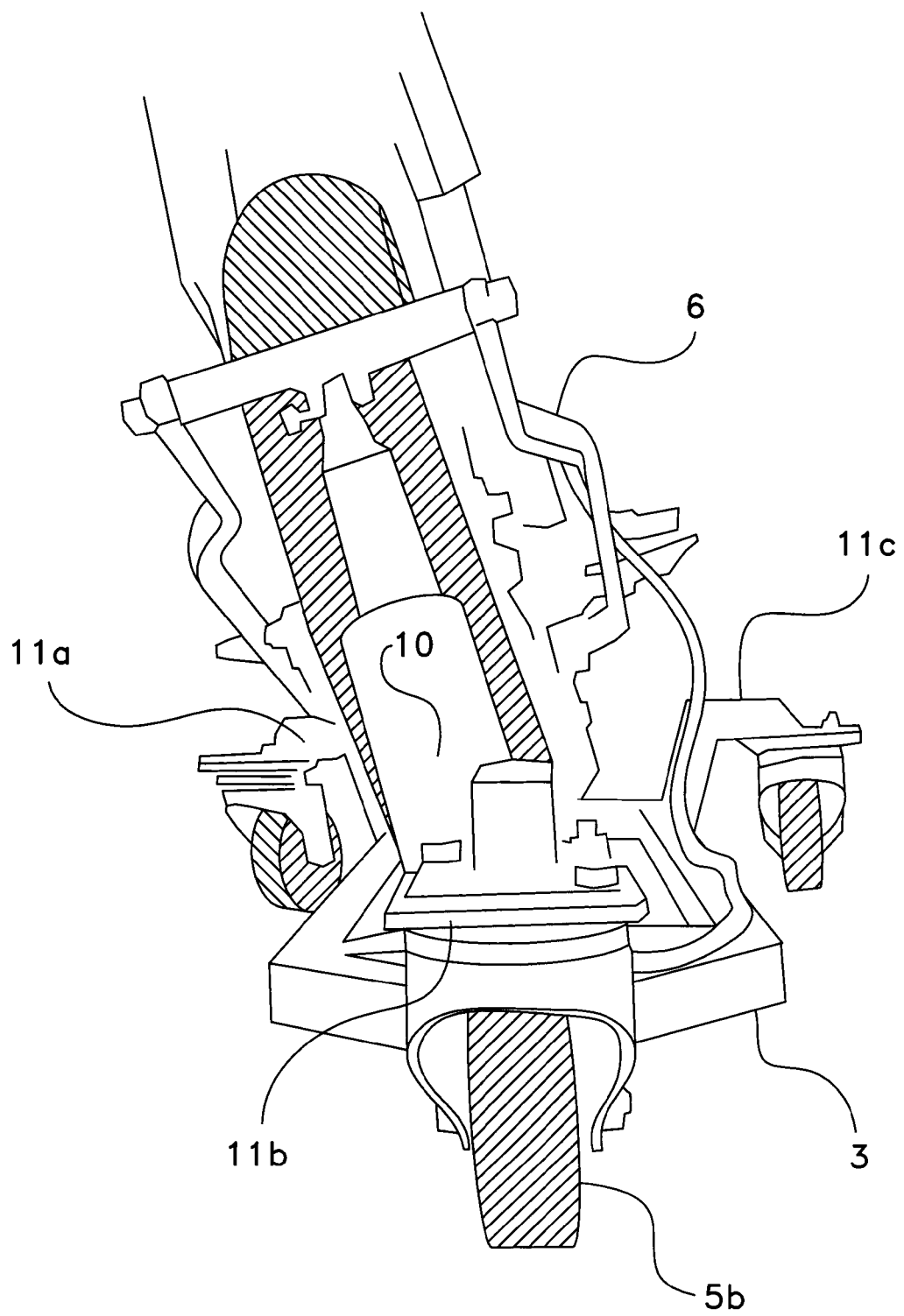
FIG. 3 shows the front wheel of the motorcycle turned to the left on the first embodiment of the raiser as seen from the front.
Figure 4:
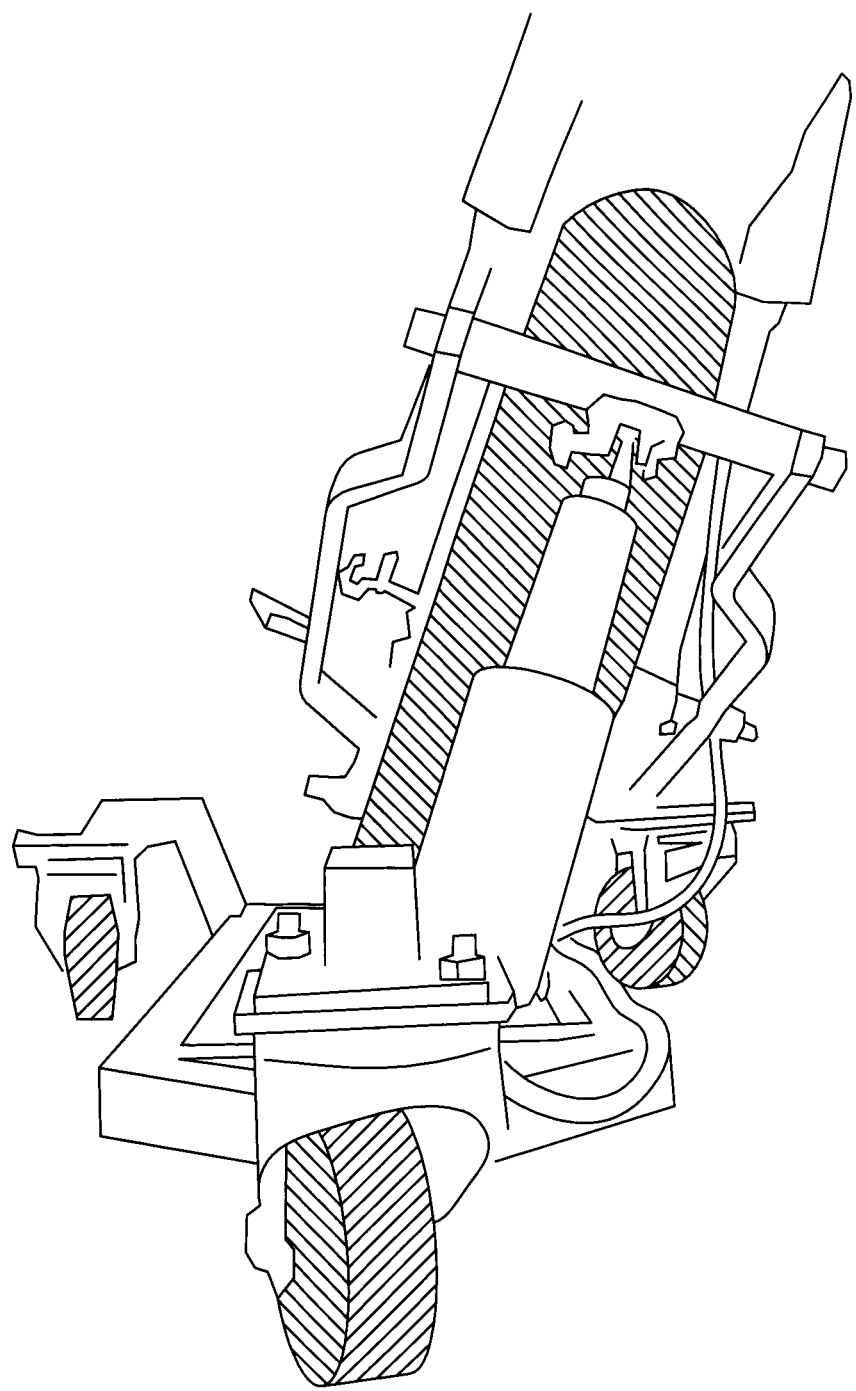
FIG. 4 shows the front wheel of the motorcycle turned to the right on the first embodiment the raiser as seen from the front.

FIGS. 3 and 4 show the front wheel of the motorcycle mounted on the first embodiment the raiser as seen from the front. In FIG. 3 the front wheel is turned to the left of the figure, that is the way it would turn when the motorcycle turns to the right, while in FIG. 4 the front wheel is turned to the right of the figure, that is the way it would turn when the motorcycle turns to the left. The figures illustrate the raiser in greater detail and show how the raiser works at curves.

In the front of the figures, that is closest to the viewer, the front support wheel 5*b* is visible that is attached to the lower side of a front support wheel carrier 11, that extends upwards above the supporting frame 3. Both rear support wheels 11*a, c* are arranged outside the frame on the left and right sides of the frame, respectively. The rear support wheels too are arranged on support wheel carriers 11*a* that extend upwards above the supporting frame 3 and extend outwards from the supporting frame.

The front wheel of the motorcycle extends downwards through the raising frame 6 and the supporting frame 3. It is held in this position as it is rotatably attached to the rotational axis of the front wheel at the raising frame. The raising frame is held at a chosen height relative to the supporting frame using the controllable hydraulic cylinder 10. The cylinder may be angled sideways relative to the supporting frame around an axis of rotation that is aligned with the supporting frame, that is very close to the ground surface. This means that the front wheel is aligned against the road surface with a pressure that is very near independent of at which angle the front wheel is angled.

The disclosed embodiments show hydraulic cylinders 10, but these may obviously be replaced by pneumatic cylinders, linear motors or any other controllable translator units. The invention is here described when used with a motorcycle, but it may obviously be used with any other two-wheeled vehicle or any other type of vehicle that tilts substantially when driving through a curve. For simplicity, all these types of vehicles are here included in the concept of motorcycle.

The invention claimed is:

1. A raiser (2) for skidpan practice with a motorcycle (1), comprising a supporting portion (3) with support wheels (5*a-c*) and a raising portion (6) attachable to a front wheel (4) of the motorcycle (1) to allow the front wheel (4) to rotate around a first rotational axis (7), wherein
   the raising portion (6) is raisable and lowerable with respect to the supporting portion (3), and
   the raising portion (6) is rotatable around a second axis of rotation (13) essentially extending in a direction of motion of the front wheel (4).

2. A raiser (2) according to claim 1, wherein the second axis of rotation (13) is arranged below an upper end of the supporting wheels (5*a-c*).

3. A raiser according to claim 2, wherein the second axis of rotation (13) is arranged below rotational axes of the supporting wheels (5*a-c*).

4. A raiser (2) according to claim 1, wherein the second axis of rotation (13) is arranged below rotational axes of the supporting wheels (5*a-c*).

5. A raiser (2) according to claim 1, wherein the supporting portion (3) is constituted by a supporting frame (3) receiving the front wheel (4).

6. A raiser (2) according to claim 5, wherein the support wheels (5*a-c*) are mounted on support wheel carriers (11*a-c*) extending upwardly above the supporting frame (3).

7. A raiser (2) according to claim 1, wherein the second axis of rotation (13,) is arranged below the supporting portion (3).

8. A raiser (2) according to claim 1, wherein the first and second axes of rotation (7,13) are substantially perpendicular to one another.

9. A raiser (2) according to claim 1, comprising three supporting wheels (5*a-c*), two rear supporting wheels (5*a*) and one front supporting wheel (5*b*), wherein
   the supporting portion (3) is constituted by an essentially rectangular frame (3) having a rectangular opening through which the front wheel (4) of the motorcycle (1) extends,
   the supporting wheels (5*a-c*) are each mounted on a rotatable, vertical axle to turn in any given direction, and
   additionally comprising front and rear support struts (8, 9) tiltably coupling the raising portion (6) to the supporting portion (3), and tillable towards either side of the motorcycle (1) to angle the front wheel (4) left or right respectively,
   with the front support strut (9) constituted by a hydraulic cylinder (10) such that when said cylinder (10) is fully extended, ground pressure is primarily applied by the three supporting wheels (5*a-c*) and the motorcycle reacts as if friction is low.

10. A raiser (2) according to claim 1, comprising
   front and rear support struts (8,9) tiltably coupling the raising portion (6) to the supporting portion (3), and tiltable towards either side of the motorcycle (1) to angle the front wheel (4) left or right respectively,.
   with the front support strut (9) constituted by a hydraulic cylinder (10) such that when said cylinder (10) is fully extended, ground pressure is primarily applied by the three supporting wheels (5*a-c*) and the motorcycle reacts as if friction is low.

11. A raiser (2) according to claim 1, wherein the raising portion (6) is mounted upon the supporting portion (3) to be rocked from side-to-side in a direction substantially parallel to the first rotational axis (7).

12. A device for skidpan practice with a motorcycle (1), comprising a pair of supports (12a-b) preventing the motorcycle from falling over, a raiser (2) comprising a supporting portion (3) with support wheels (5a-c) and a raising portion (6) attachable to a front wheel (4) of the motorcycle (1) to allow the front wheel (4) to rotate around a first rotational axis 7), wherein the raising portion (6) is raisable and lowerable with respect to the supporting portion (3), and the raising portion (6) is rotatable around a second axis of rotation (13) essentially extending in a direction of motion of the front wheel (4).

13. A device for skidpan practice according to claim 12, wherein the supports (12a-b) each comprise a roller (15) at respective ends allowing the supports (12a-b) to roll over ground surface.

14. A device for skidpan practice according to claim 12, wherein the supports (12a-b) are outwardly pivotal is a direction substantially parallel to the first rotational axis (7).

15. A device for skidpan practice according to claim 12, wherein the supporting portion (3) is constituted by an essentially rectangular frame (3) having a rectangular opening through which the front wheel (4) of the motorcycle (1) extends, and comprising four support wheels (5a-c) respectively attached to corners of the support frame (3), with the second axis of rotation (13) arranged under a lower side of the support frame (3).

16. A device for skidpan practice according to claim 12, wherein the raising portion (6) is mounted upon the supporting portion (3) to be rocked from side-to-side in a direction substantially parallel to the first rotational axis (7).

* * * * *